United States Patent
Oosaki et al.

(10) Patent No.: US 7,539,708 B2
(45) Date of Patent: May 26, 2009

(54) BACKUP SYSTEM, BACKUP CONTROLLING APPARATUS, BACKUP DATA MANAGING METHOD AND A COMPUTER READABLE RECORDING MEDIUM RECORDED THEREON BACKUP CONTROLLING PROGRAM

(75) Inventors: Yoshiki Oosaki, Maebashi (JP); Minoru Masuda, Inagi (JP)

(73) Assignee: Fujitsu Limited, Kawasaki (JP)

( * ) Notice: Subject to any disclaimer, the term of this patent is extended or adjusted under 35 U.S.C. 154(b) by 385 days.

(21) Appl. No.: 11/038,113

(22) Filed: Jan. 21, 2005

(65) Prior Publication Data

US 2005/0125467 A1 Jun. 9, 2005

Related U.S. Application Data

(63) Continuation of application No. PCT/JP02/12962, filed on Dec. 11, 2002.

(51) Int. Cl.
G06F 17/30 (2006.01)
(52) U.S. Cl. ...................... 707/204; 707/100
(58) Field of Classification Search ................ 707/204, 707/100, 101, 200
See application file for complete search history.

(56) References Cited

U.S. PATENT DOCUMENTS

| | | | | | |
|---|---|---|---|---|---|
| 5,751,997 | A | * | 5/1998 | Kullick et al. | 711/162 |
| 7,028,153 | B1 | * | 4/2006 | Noble et al. | 711/162 |
| 7,100,007 | B2 | * | 8/2006 | Saika | 711/162 |
| 7,136,976 | B2 | * | 11/2006 | Saika | 711/162 |
| 2002/0169889 | A1 | * | 11/2002 | Yang et al. | 709/244 |
| 2003/0056139 | A1 | * | 3/2003 | Murray et al. | 714/4 |
| 2003/0126247 | A1 | * | 7/2003 | Strasser et al. | 709/223 |
| 2004/0236988 | A1 | * | 11/2004 | Sastrel | 714/13 |
| 2005/0010609 | A1 | * | 1/2005 | Katoh et al. | 707/200 |
| 2005/0055521 | A1 | * | 3/2005 | Saika | 711/162 |

FOREIGN PATENT DOCUMENTS

JP 9-146812 6/1997

(Continued)

OTHER PUBLICATIONS

J. Gray, et al., "Online Transaction Processing Systems" first edition, McGraw Hill Publishing Co., Japan Ltd., pp. 81-89, Jul. 25, 1991.

(Continued)

Primary Examiner—Cheryl Lewis
(74) Attorney, Agent, or Firm—Staas & Halsey LLP

(57) ABSTRACT

A backup system which can diminish a danger that backup data of a storage of a computer to be backed up sustains a damage due to disaster, an accident or the like, and restore the storage easily and within a short time when the storage up is damaged or lost due to disaster, an accident or the like. The system can be configured with a small facility investment.

The system comprises a plurality of backup data storages, an archiving place determining unit for selectively determining a backup data storage physically away from an area in which the storage is located as an archiving place among the plural backup data storages on the basis of the area in which the storage is located, and a backup processing unit for storing the backup data in the backup data storage determined as the archiving place by the archiving place determining unit.

20 Claims, 8 Drawing Sheets

FOREIGN PATENT DOCUMENTS

| | | |
|---|---|---|
| JP | 9-305466 | 11/1997 |
| JP | 11-134380 | 5/1999 |
| JP | 11-149412 | 6/1999 |
| JP | 11149412 | 6/1999 |
| WO | WO 02/065294 | 8/2002 |

OTHER PUBLICATIONS

"Q&A", Nikkei Pasokon (Personal Computer), No. 398, pp. 270-274, Nov. 26, 2001.

H. Umeda, "SQL Server 7.0" DB Magazine, vol. 10, No. 9, pp. 113-121, Nov. 2000.

Takashi Hara, "Answer [Q & A]", Nikkei PC, Japan, Nikkei BP, No. 398, Nov. 26, 2001, pp. 270-271.

Yuji Hirose, "File Open System Built With FTP and WebDAV", UNIX User, Softbank Publishing, Japan, vol. 10, No. 10, Oct. 1, 2001, pp. 51-63.

Japanese Patent Office Action, mailed Mar. 11, 2008 and issued in corresponding Japanese Patent Application No. 2004-558374.

Japanese Patent Office Action, mailed Jun. 10, 2008 and issued in corresponding Japanese Patent Application No. 2004-558374.

Japanese Patent Office Action, mailed Mar. 11, 2008 and issued in corresponding Japanese Patent Application No. 2004-558374.

Arguments filed on May 5, 2008 in Response to Japanese Patent Office Action, mailed Mar. 11, 2008 and issued in corresponding Japanese Patent Application No. 2004-558374.

* cited by examiner

FIG. 2

| USER ALLOCATED AREA | STORING AREA | FEATURE/ATTRIBUTE |
|---|---|---|
| 1 | 1 | |
| | ⋮ | |
| | x | |
| 2 | 1 | |
| | ⋮ | |
| | x | |
| ⋮ | ⋮ | ⋮ |
| n | 1 | |
| | ⋮ | |
| | x | |

FIG. 3

| SECTION | CLASSIFICATION | AREA INFORMATION | DATE (yyyymmdd) | FEATURE |
|---|---|---|---|---|
| 1 | 1 | BOOT, OS AREA, APL AREA | 20020101 | W2K SP2 |
|   | 2 | DATA AREA | ------ | NONE |
|   | 3 | MAINTENANCE AREA | ------ | NONE |
| 2 | 1 | BOOT, OS AREA, APL AREA | 20020201 | W2K SP3 |
|   | 2 | DATA AREA | 20020201 | XXXX |
|   | 3 | MAINTENANCE AREA | 20020201 | YYYY |

...

| | | | | |
|---|---|---|---|---|
| x | 1 | BOOT, OS AREA, APL AREA | 20021101 | Win XP |
|   | 2 | DATA AREA | 20021101 | XXXX |
|   | 3 | MAINTENANCE AREA | 20021101 | YYYY |

FIG. 4

| CONTRACTOR INFORMATION | | | | ARCHIVE INFORMATION | | | |
|---|---|---|---|---|---|---|---|
| CONTRACT ACCOUNT | POSTAL CODE | TELEPHONE NUMBER | ARCHIVE DESIGNATION | SECTION | CLASSIFICATION | ARCHIVING PLACE (AREA) |
| ABC | 812-0000 | 011-*-** | DEFAULT | 1 | 1 | HARD DISK FOR BACKUP 6a (HOKKAIDO) |
| | | | DEFAULT | 2 | 2 | HARD DISK FOR BACKUP 6a (HOKKAIDO) |
| | | | ... | | | ... |
| | | | DESIGNATED ARCHIVING PLACE | n | n | HARD DISK FOR BACKUP 6b (TOKYO) |
| EFG | 060-0000 | 092-*-** | DEFAULT | 1 | 1 | HARD DISK FOR BACKUP 6e (OKINAWA) |
| | | | DESIGNATED ARCHIVING PLACE | 2 | 2 | HARD DISK FOR BACKUP 6c (OSAKA) |
| | | | ... | | | ... |
| | | | DEFAULT | n | n | HARD DISK FOR BACKUP 6e (OKINAWA) |

.....

| | | | | | | |
|---|---|---|---|---|---|---|
| HIJ | 100-8915 | 03-3581-**** | DESIGNATED MANAGING AREA | 1 | 1 | HARD DISK FOR BACKUP 6b (TOKYO) |
| | | | DEFAULT | 2 | 2 | HARD DISK FOR BACKUP 6e (OKINAWA) |
| | | | ... | | | ... |
| | | | DEFAULT | n | n | HARD DISK FOR BACKUP 6e (OKINAWA) |

FIG. 6(a)

| CLASSIFICATION 3 | DATA AREA | ABSENT | ABSENT | ABSENT | ABSENT | PRESENT:C | PRESENT:D | | PRESENT:F |
|---|---|---|---|---|---|---|---|---|---|
| CLASSIFICATION 2 | APL AREA | ABSENT | ABSENT | PRESENT:A | PRESENT:B | ABSENT | ABSENT | | PRESENT:E |
| CLASSIFICATION 1 | BOOT, OS AREA | Win98 | Win2K | Win98 | Win2K | ABSENT | ABSENT | | Win2K SP3 |
| SECTION | | SECTION 1 | SECTION 2 | SECTION 3 | SECTION 4 | SECTION 5 | SECTION 6 | ... | SECTION n |

→ TIME AXIS

FIG. 6(b)

| DATA AREA | PRESENT: F |
|---|---|
| APL AREA | PRESENT: B |
| BOOT, OS AREA | Win2K |

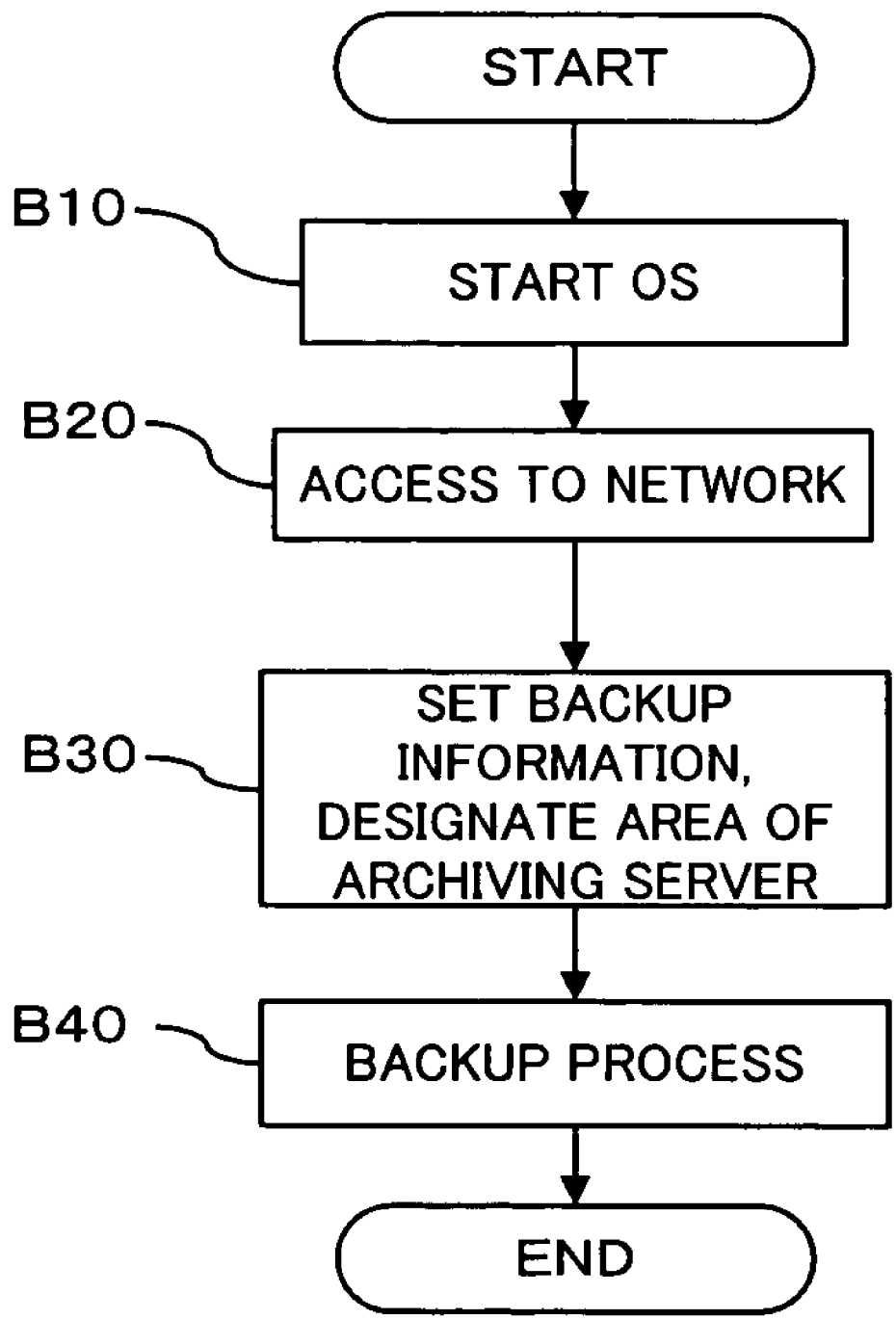

BACKUP SYSTEM, BACKUP CONTROLLING APPARATUS, BACKUP DATA MANAGING METHOD AND A COMPUTER READABLE RECORDING MEDIUM RECORDED THEREON BACKUP CONTROLLING PROGRAM

This application is a continuation application, filed under 35 USC 111(a), of International Application PCT/JP2002/012962, filed Dec. 11, 2002.

FIELD OF THE INVENTION

The present invention relates to a backup system, a backup controlling apparatus, a backup data managing method and a computer readable recording medium recorded thereon backup controlling program suitable for use to back up data in a storage provided to, for example, a computer system connected to the Internet.

DESCRIPTION OF THE RELATED ART

As a method for backing up data in a hard disk integrated in or (externally) connected to a computer used by an enterprise or individual, it is general that necessary information (updatable work files and the like) in the hard disk is copied to another recording medium (for example, magnetic recording medium such as flexible disk, hard disk or the like, magneto-optical disk, DVD-R, DVD-RW, DVD-RAM or the like) using a storage [for example, magnetic storage, magneto-optical (MO) disk drive, DVD drive or the like] connected to the computer according to the intension of the user.

Such backup of a hard disk is performed with a storage directly connected to the computer even when the computer is connected to another computer system over a LAN (Local Area Network), a WAN (Wide Area Network) or a telephone line. As the known backup method, it is general that only updatable work files present in the hard disk are backed up.

Backup data prepared by backup or various kinds of information relating to the backup data are basically managed by the user.

Patent Application Laid-Open No. HEI 11-149412 discloses an information safe-deposit box system for storing data prepared by an information device such as a PC or the like or backup data thereof in an information storage located in a remote place using a communication network such as the Internet, a personal computer communication service organization or the like, thereby to prevent important data from being lost due to disaster such as an earthquake, fire or the like.

In the information safe-deposit box system disclosed in Patent Application Laid-Open No. HEI 11-149412, the user can freely access to a memory area allocated to the user in the information safe-deposit box connected to the Internet to store or read data prepared by an information device such as a PC or the like or backup data thereof. Even if the data in hard disk located in the office or house of the subscriber, or data in a stored recording medium such as a floppy disk, optical disk or the like is lost due to disaster such as an earthquake, fire or the like, the subscriber can access to the managing apparatus over the Internet to access to the allocated memory area in the information safe-deposit box after the information device in his/her office, house or the like is restored, thereby reading out the stored data.

The information safe-deposit box system disclosed in Patent Application Laid-Open No. HEI 11-149412 has another information safe-deposit box (second information safe-deposit box) in a place differing from the place in which the above information safe-deposit box (first information safe-deposit box) is located, wherein, generally, backup data transmitted from the first safe-deposit box is stored in the second safe-deposit box. In case that abnormality of the first information deposit-box occurs, the user can access to the memory area of the backup data stored in the second information safe-deposit box over the Internet.

In such the known backup method, it is general that the prepared backup data (recording medium) is stored in the same building or in a place in the neighborhood of the place in which the computer having the hard disk to be backed up is located. If the hard disk of the computer to be backed up is damaged or lost due to disaster such as an earthquake, flood or the like, or an accident or the like, there is danger that the backup data is simultaneously damaged together with the hard disk.

The known backup method mainly targets work files present in the hard disk. When data in the hard disk becomes unusable due to an unexpected event, the operational files which have been backed up can be restored, but files of the work system, driver, application software and the like other than the work files have to be, for example, installed as well, which requires a long time and a lot of labor in order to restore the files into the original state.

The management of the backup data is imposed on each of the users, which is a large load on the user who has to manage the backup data. For example, when the user does a work which causes a change in system environments of the computer such as installation of application, addition of new hardware or the like, it is general that the user backs up various kinds of data of the computer before the change in order to restore the data into the state before the change in case of emergency. When the user carries out the backup to cope with a change in the system environments as this, the user has to manage each of the prepared backup data (medium) and the features of the system at that time.

In the information safe-deposit box system disclosed in Japanese Unexamined Patent Application Publication No. HEI 11-149412, a place in which the computer of the user is located and a place in which the information safe-deposit box (first information safe-deposit box) are not always geographically far from each other. When disaster or the like occurs in a place in which the computer of the user is located, there is a danger that data stored in the information safe-deposit box is lost together with data in the hard disk of the computer of the user. When the second information safe-deposit box is located in a place differing from a place in which the first information safe-deposit box is located and the backup data in the first information safe-deposit box is stored in the second information safe-deposit box, the facility investment and the operation cost increase.

In the light of the above disadvantages, an object of the present invention is to provide a backup system, a backup controlling apparatus, a backup data managing method, a backup controlling program and a computer readable recording medium recording thereon the backup controlling program, whereby, even when a storage of a computer to be backed up is damaged or lost due to disaster, an accident or the like, it is possible to largely diminish a chance that the backup data in the storage sustains a damage caused by the disaster or accident, restore the storage easily and within a short time, and can configure the system with a small investment.

SUMMARY OF THE INVENTION

To attain the above object, a backup system according to this invention comprises a plurality of backup data storages located in areas differing from one another to archive data in a storage provided to an information processing apparatus as backup data, an archiving place determining unit for selectively determining a backup data storage physically away from an area in which the storage is located among the plural backup data storages as an archiving place on the basis of the area in which the storage is located, and a backup processing unit for storing the backup data in the backup data storage determined as the archiving place by the archiving place determining unit.

The backup system may further comprise information for reference configured by beforehand relating information for specifying the information processing apparatus or information for specifying a user of the information processing apparatus to the backup data storage physically away from the area in which the storage provided to the information processing apparatus is located, and the archiving place determining unit may refer to the information for reference on the basis of the information for specifying the information processing apparatus or the information for specifying a user of the information processing apparatus, and selectively determine the backup data storage as the archiving place among the plural backup data storages.

The backup system may further comprise an area determining unit communicably connected to the information processing apparatus over a communication line, and determining an area in which the storage is located, and the archiving place determining unit may selectively determine, on the basis of the area in which the storage is located determined by the area determining unit, the backup data storage physically away from the area in which the storage is located as the archiving place among the plural backup data storages.

The backup system may further comprise a degree-of-importance designating unit for designating a degree of importance of data in the storage, and the archiving place determining unit may preferentially determine a backup data storage physically farther from the area in which the storage is located as the degree of importance is higher among the plural backup data storages according to the degree of importance designated by the degree-of-importance designating unit.

The backup system may further comprise an archiving place designation inputting unit being able to selectively designate a specific backup data storage among the plural backup data storages, and the archiving place determining unit may selectively determine the backup data storage designated by the archiving place designation inputting unit as the archiving place.

The backup system may further comprise an information inputting unit being able to input information about the backup data as attribute information, and the backup processing unit may relate the attribute information inputted from the information inputting unit to the backup data, and record the attribute information and the backup data.

The information processing apparatus may partially extract the data from data in the storage, and prepare backup data, and the backup processing unit may archive the backup data in the backup data storage.

The backup system may further comprise a restoration processing unit for restoring the backup data stored in the backup data storage onto an arbitrary storage. The backup system may further comprise a backup data selecting unit being able to select at least one set of backup data among plural sets of the backup data, and the restoration processing unit may restore the backup data selected by the backup data selecting unit onto the arbitrary storage.

A backup controlling apparatus according to this invention for archiving data in a storage provided to an information processing apparatus as backup data in at least one of a plurality of backup data storages located in areas differing from one another, comprises an archiving place determining unit for selectively determining a backup data storage physically away from an area in which the storage is located as an archiving place among the plural backup data storages on the basis of the area in which the storage is located.

The backup controlling apparatus may further comprise information for reference configured by relating information for specifying the information processing apparatus or information for specifying a user of the information processing apparatus to the backup data storage physically away from the area in which the storage provided to the information processing apparatus is located, and the archiving place determining unit may refer to the information for reference on the basis of the information for specifying the information processing apparatus or the information for specifying a user of the information processing apparatus, and selectively determine the backup data storage as the archiving place among the plural backup data storages.

The backup controlling apparatus may further comprise an area determining unit communicably connected to the information processing apparatus over a communication line, and determining the area in which the storage is located, and the archiving place determining unit may selectively determine, on the basis of the area in which the storage is located determined by the area determining unit, the backup data storage physically away from the area in which the storage is located as the archiving place among the plural backup data storages.

The archiving place determining unit may preferentially determine a backup data storage unit physically farther from the area in which the storage is located as a degree of importance of data in the storage is higher as the archiving place among the plural backup data storages according to the degree of importance of data in the storage. Information about the backup data may be related as attribute information to the backup data, and recorded.

The backup controlling apparatus may further comprise a restoration processing unit for restoring the backup data stored in the backup data storage onto an arbitrary storage. The restoration processing unit may restore at least one set of backup data selected from plural sets of the backup data onto the arbitrary storage.

A backup data managing method according to this invention for archiving data in a storage provided to an information processing apparatus as backup data in at least one of a plurality of backup data storages located in areas differing from one another, comprises an archiving place determining step of selectively determining a backup data storage physically away from an area in which the storage is located among the plural backup data storages as an archiving place on the basis of the area in which the storage is located, and a backup processing step of storing the backup data in the backup data storage determined as the archiving place at the archiving place determining step.

The backup data managing method may further comprise an information-for-reference preparing step of preparing information for reference configured by relating information for specifying the information processing apparatus or information for specifying a user of the information processing apparatus to the backup data storage physically away from the area in which the storage provided to the information processing apparatus is located, and, at the archiving place determining step, the information for reference may be referred on the basis of the information for specifying the information processing apparatus or the information for specifying a user of the information processing apparatus to selectively determine the backup data storage as the archiving place among the plural backup data storages.

The backup data managing method may further comprise an area determining step of determining the area in which the storage is located, and, at the archiving place determining step, on the basis of the area in which the storage is located determined at the area determining step, the backup data storage physically away from the area in which the storage is located may be selectively determined as the archiving place among the plural backup data storages.

The backup data managing method may further comprise a degree-of-importance designating step of designating a degree of importance of data in the storage, and, at the archiving place determining step, a backup data storage physically farther from the area in which the storage is located may be determined as the archiving place as the degree of importance is higher among the plural backup data storages according to the degree of importance designated at the degree-of-importance designating step.

The backup data managing method may further comprise an archiving place designation inputting step at which a specific backup data storage can be selectively designated among the plural backup data storages, and, at the archiving place determining step, the backup data storage designated at the archiving place designation inputting step may be selectively determined as the archiving place.

The backup data managing method may further comprise an information inputting step at which information about the backup data can be inputted as attribute information, and, at the backup processing step, the attribute information inputted at the information inputting step may be related to the backup data, and recorded.

The backup data managing method may further comprise a backup data preparing step of partially extracting the data from data in the storage, and preparing backup data, and, at the backup processing step, the backup data prepared at the backup data preparing step may be archived in the backup data storage.

The backup data managing method may further comprise a restoration processing step of restoring the backup data stored in the backup data storage onto an arbitrary storage. The backup data managing method may further comprising a backup data selecting step at which at least one set of backup data can be selected among plural sets of backup data, and, at the restoration processing step, the backup data selected at the backup data selecting step may be restored onto the arbitrary storage.

A computer readable recording medium recorded thereon a backup controlling program according to this invention for making a computer execute a backup controlling function of archiving data in a storage provided to an information processing apparatus as backup data in at least one of a plurality of backup data storages located in areas differing from one another, the backup controlling program making the computer function as an archiving place determining unit for selectively determining a backup data storage physically away from an area in which the storage is located as an archiving place among the plural backup data storages on the basis of the area in which the storage is located.

The archiving place determining unit may refer to, on the basis of information for specifying the information processing apparatus or information for specifying a user of the information processing apparatus, information for reference configured by relating the information for specifying the information processing apparatus or the information for specifying a user of the information processing apparatus to the backup data storage physically away from the area in which the storage provided to the information processing apparatus is located, and selectively determine the backup data storage as the archiving place among the plural backup data storages.

The computer readable recording medium recorded thereon the backup controlling program may make the computer function as an area determining unit for determining the area in which the storage is located, and the archiving place determining unit may selectively determine, on the basis of the area in which the storage is located determined by the area determining unit, the backup data storage physically away from the area in which the storage is located as the archiving place among the plural backup data storages.

The archiving place determining unit may preferentially determine a backup data storage physically farther from the area in which the storage is located as a degree of importance of data in the storage is higher as the archiving place among the plural backup data storages according to the degree of importance of data in the storage. Information about the backup data may be related as attribute information to the backup data, and recorded.

The computer readable recording medium recorded thereon the backup controlling program may make the computer function as a restoration processing unit for restoring the backup data stored in the backup data storage onto an arbitrary storage. The restoration processing unit may restore at least one set of the backup data selected among plural sets of the backup data onto the arbitrary storage.

The backup system, the backup controlling apparatus, the backup data managing method and the computer readable recording medium recorded thereon the backup controlling program according to this invention provide the following effects and advantages.

(1) A backup data storage physically away from an area in which the storage is located is selectively determined as an archiving place among a plurality of backup data storages on the basis of the area in which the storage is located, and backup data is archived in the backup data storage determined as the archiving place. Accordingly, even when the storage of an information processing apparatus is damaged or lost due to disaster caused by an earthquake, flood or the like, hard disk failure or virus infection, one of various accidents such as abnormality of the operation caused by installation of a driver for connecting a new peripheral equipment or application software and the like, it is possible to diminish the possibility that the backup data storage archiving the backup data is simultaneously damaged, thereby to improve the security level of the data.

Even when data in the information processing apparatus or the storage of the user is lost due to disaster such as an earthquake, fire or the like, the backup data archived in the backup storage can be restored, and contents of the storage can be restored to a state nearest to the state before the abnormality occurs, quickly and certainly, by accessing to the backup data storage over a communication line after the information processing apparatus is restored. It is possible to configure such system with the minimum facility investment.

(2) An area in which the storage is located is determined, and a backup data storage physically away from the storage is selectively determined as the archiving place among a plurality of backup data storages on the basis of the determined area in which the storage is located. Accordingly, it is possible to archive the backup data in a backup data storage physically away from the storage, readily and certainly. This is very convenient.

(3) The user can selectively designate a specific backup data storage among a plurality of backup data storages by means of the information processing means. Accordingly, it is possible to set an archiving place according to the intension of the user. This is very convenient.

(4) Information about backup data is inputted as attribute information, and the inputted attribute information is related to the backup data and recorded in the backup data storage. Accordingly, it becomes easy to discriminate each backup data. This is very helpful when the backup data is restored onto the storage, for example.

When various kinds of data in an information processing apparatus is backed up before a work which may cause a change in the system environments of the information processing apparatus such as installation of application software, addition of new hardware or the like, it is possible for the user to easily know the features of prepared backup data (medium) and the system at that time, for example. Additionally, each user does not need to manage the backup data, thus the burden on the user required to manage the backup data can be decreased.

(5) Data is partly extracted from data in the storage to prepare the backup data, and the backup data is archived in the backup data storage. When this backup data is restored onto the backup data storage, the user selects at least one set of backup data among plural sets of backup data, and restores the data. Accordingly, it is possible to readily configure a storage having a data structure that the user desires. This is very convenient.

BRIEF DESCRIPTION OF DRAWINGS

FIG. 2 is a diagram schematically showing a structure of a hard disk for backup in the backup system according to the embodiment of this invention;

FIG. 3 is a diagram showing an example of a management table for the hard disk for backup in the backup system according to the embodiment of this invention;

FIG. 4 is a diagram showing an example of a user information database in the backup system according to the embodiment of this invention;

FIG. 6(a) is a diagram showing a list in which plural kinds of backup data managed by a backup server are arranged in time series in the backup system according to the embodiment of this invention;

FIG. 6(b) is a diagram schematically showing a structure of a restored hard disk;

FIG. 7 is a flowchart for illustrating a backup process in the backup system according to the embodiment of this invention.

DESCRIPTION OF THE PREFERRED EMBODIMENT(S)

Hereinafter, description will be made of an embodiment of this invention with reference to the drawings.

Figure 1:
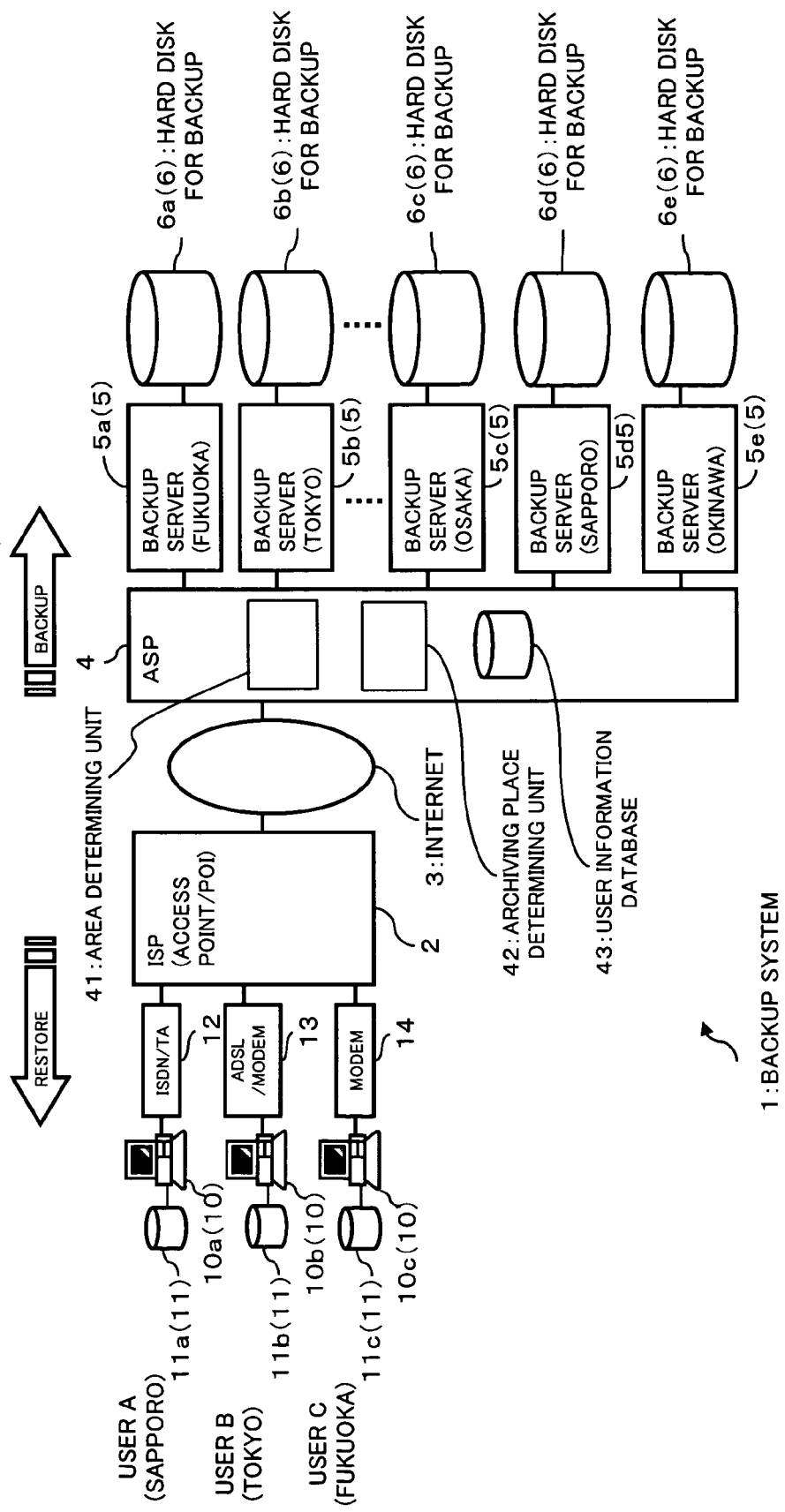
FIG. 1 is a block diagram showing a structure of a backup system according to an embodiment of this invention.

FIG. 1 is a block diagram showing a structure of a backup system according to an embodiment of this invention. The backup system 1 backs up data in a hard disk (storage) 11 provided to a computer (information processing apparatus) 10 connected to the Internet 3.

As shown in FIG. 1, the backup system 1 comprises a PC (Personal Computer) 10 (11a, 10b, 10c), an ISP (Internet Service Provider) 2, an ASP (Application Service Provider) 4, a backup server 5 (5a, 5b, 5c, 5d, 5e) and a hard disk 6 (6a, 6b, 6c, 6d, 6e).

Each of the PCs 10a, 10b and 10c is an information processing apparatus connected to the Internet 3. In this embodiment, each of the PCs 10a, 10b and 10c is connected to the Internet 3 through the ISP 2. In this embodiment, there are three PCs, that is, the PC 10a used by user A (user), the PC 10b used by user B (user) and the PC 10c used by user C (user). The users A, B and C use specific PCs 10a, 10b and 10c, respectively. The PC 10a is located in Sapporo, the PC 10b in Tokyo, and the PC 10c in Fukuoka.

The PC 10a is connected to the ISP 2 over an ISDN (Integrated Services Digital Network). The PC 10a is connected to the Internet 3 by dialing-up an access point of the ISP 2 to be connected thereto using a TA 12. The PC 10c is connected to the ISP 2 over a public telephone line. The PC 10c is connected to the Internet 3 by dialing-up an access point of the ISP 2 to be connected to thereto, using a modem 14.

The PC 10b is connected to the ISP 2 over an ADSL (Asymmetric Digital Subscriber Line). The PC 10b is connected to the Internet 3 by connecting to a POI (Point of Interface) with the ISP 2 using an ADSL modem 13.

Hereinafter, reference character 10a, 10b or 10c is used when it is necessary to specify one of the plural PCs. When an arbitrary PC is designated, reference character 10 is used.

Each of the hard disks 11a, 11b and 11c is a magnetic storage device (storage) which stores various kinds of data and programs in a way that the computer can read them. The hard disk 11a is connected to the PC 10a. Similarly, the hard disk 11b is connected to the PC 11b, and the hard disk 11c is connected to the PC 11c.

In this embodiment, at least a part of the data stored in each of the hard disks 11a, 11b and 11c is stored as backup data in a hard disk for backup 6 (6a, 6b, 6c, 6d or 6e) to be described later.

In this backup system 1, the hard disk (magnetic storage device) is used as the storage, but this invention is not limited to this. For example, another computer readable recording media such as a memory, flexible disk, memory card, magneto-optical storage device, CD-ROM, CD-R, CD-RW, DVD, DVD-R, DVD-RW or the like may be used as the storage.

Hereinafter, when it is necessary to specify one of the plural hard disks, reference character 11a, 11b or 11c is used as a reference character designating the hard disk. When an arbitrary hard disk is designated, reference character 11 is used.

The PC 10 selects and extracts at least a part of data stored in the hard disk 11 as backup data, and transmits the data to a backup server 5 (5a, 5b, 5c, 5d or 5e) managed by the ASP 4 to be described later. The backup data may be prepared by partially extracting a data area in which data that can be updated by various programs is stored, a boot area in which data relating to the system is stored, an OS (Operating System) area, an application (APL) area, a maintenance information area in which information about maintenance of the system is stored, and the like from data stored in the hard disk 11, for example. Alternatively, it is possible to prepare the whole data in the hard disk 11 as a disk image.

In this embodiment, the PC 10a and the hard disk 11a connected to the PC 10a are located in places physically in proximity to each other. Similarly, the PC 10b and the hard disk 11b connected to the PC 10b are located in places physically in proximity to each other, and the PC 10c and the hard disk 11c are located in places physically in proximity to each other.

In this embodiment, the area in which the PC 10 is located is equivalent to the area in which the hard disk 11 is located. It is thus possible to determine the place in which the hard disk 11 is located by determining the area in which the PC 10 is located.

The ISP (Internet Service Provider) 2 provides a connection service to the Internet to the users (in this embodiment, user A, user B and user C; users). The ISP 2 provides an access point to be accessed from the modem 14 or the TA 12, or provides a point of interface (POI) with the ADSL, thereby providing a destination to be connected over the Internet to the user.

The Internet (communication line) 3 is a huge network formed by connecting computer networks such as LANs (Local Area networks), WANs (Wide Area Networks) and the like scattered in many places to one another.

The user connects the PC 10 to the Internet 3, thereby receiving various services provided over the Internet 3 or share various kinds of information present on the Internet 3. In this system 1, the PC 10 (10a, 10b, 10c) is so connected to the ASP 4, the backup server 5 (5a, 5b, 5c, 5d, 5e) and the hard disk for backup 6 (6a, 6b, 6c, 6d, 6e) as to be able to communicate with the same.

The application service provider (ASP) 4 (service providing company or the like) provides application functions over the Internet 3. The ASP 4 is realized with a computer having the server function. The ASP 4 collectively operates applications in a data center called a server firm to distribute the functions of the applications to the users (PC 10) connected over the Internet 3.

In this backup system 1, the ASP 4 sets a unique identification code (contract account) and a password to each user. The ASP 4 demands a person who connects (accesses) to the ASP 4 over the Internet 3 to input the contract account and the password, determines that the person who is having an access is a proper person (contractor) only when both of the inputted contract account and password completely match with those entered in a user information database 43 (to be described later) of the ASP 4, then provides the service.

A plurality (five in FIG. 1) of backup servers (backup processing units, restoration processing units) 5a, 5b, 5c, 5d and 5e are connected to the ASP 4. The backup servers 5a, 5b, 5c, 5d and 5e manage the hard disks for backup 6a, 6b, 6c, 6d and 6e, respectively. Each of the backup servers 5a, 5b, 5c, 5d and 5e is comprised of a computer having the server function, for example.

In this backup system 1, the hard disk for backup 6a is connected to the backup server 5a, the hard disk 6b to the backup server 5b, the hard disk for backup 6c to the backup server 5c, the hard disk for backup 6d to the backup server 5d, and the hard disk for backup 6e to the backup server 5e, as shown in FIG. 1.

The backup server 5a controls storing of data in the hard disk for backup 6b and reading of data from the hard disk for backup 6a. Similarly, the backup server 5b controls storing of data in the hard disk for backup 6b and reading of data from the hard disk for backup 6b, the backup server 5c controls storing of data in the hard disk for backup 6c and reading of data from the hard disk for backup 6c, the backup server 5d controls storing of data in the hard disk for backup 6d and reading of data from the hard disk for backup 6d, and the backup server 5e controls storing data in the hard disk for backup 6e and reading data from the hard disk for backup 6e.

Namely, each of the backup servers 5a, 5b, 5c, 5d and 5e controls the data reading/writing process on the hard disk for backup 6a, 6b, 6c, 6d or 6e to store backup data in the hard disk for backup 6a, 6b, 6c, 6d or 6e (backup process), or to read out the backup data recorded on the hard disk for backup 6a, 6b, 6c, 6d or 6e, and transfers the data to a specific PC 10 (restoring process), for example.

Each of the hard disks for backup (backup data storing units) 6a, 6b, 6c, 6d and 6e is a storage (magnetic storage device) storing various data in such a way that the computer can read out the data. In this backup system 1, a hard disk is used as the backup data storage. However, this invention is not limited to this. It is possible to use another kind of computer readable recording medium such as a memory, flexible disk, memory card, magneto-optical storage device, CD-ROM, CD-R, CD-RW, DVD, DVD-R, DVD-RW or the like.

The backup server 5a and the hard disk for backup 6a, the backup server 5b and the hard disk for backup 6b, the backup server 5c and the hard disk for backup 6c, the backup server 5d and the hard disk for backup 6d, and the backup server 5e and the hard disk for backup 6e are located in areas differing from one another.

In this backup system 1, the backup server 5a and the hard disk for backup 6a are located in Fukuoke, the backup server 5b and the hard disk for backup 6b in Tokyo, the backup server 5c and the hard disk for backup 6c in Osaka, the backup server 5d and the hard disk for backup 6d in Sapporo, and the backup server 5e and the hard disk for backup 6e in Okinawa.

Hereinafter, when it is necessary to specify one of the plural backup servers, reference character 5a, 5b, 5c, 5d or 5e is used as the reference character designating the backup server. When an arbitrary backup server is designated, reference character 5 is used. Similarly, when it is necessary to specify one of the plural hard disks for backup, reference character 6a, 6b, 6c, 6d or 6e is used as reference character designating the hard disk for backup. When an arbitrary hard disk for backup is designated, reference character 6 is used.

In this embodiment, the backup server 5a and the hard disk for backup 6a connected to the backup server 5a are located in areas physically in proximity of each other. Similarly, the backup server 5b and the hard disk for backup 6b are located in areas physically in proximity of each other, as well as the backup server 5c and the hard disk for backup 6c, the backup server 5d and the hard disk for backup 6d, and the backup server 5e and the hard disk for backup 6e.

FIG. 2 is a diagram schematically showing a structure of the hard disk for backup 6 in the backup system according to the embodiment of this invention. As shown in FIG. 2, areas (user allocated areas 1 through n) for archiving backup data of respective contracting users are set in the hard disk for backup 6. Incidentally, n is a natural number representing the number of users, and the number of set user allocated areas is equal to the number of the users.

Each of the user allocated areas 1 through n has a plurality of storing areas 1 through x. The user can archive backup data in each of the storing areas. Incidentally, x is a natural number representing the number of the storing areas set in the user allocated area. The storing area is given a number in time series each time the user performs the backup, the number representing the number of times the user performs the backup.

It is possible to extract an arbitrary part such as the data area, the boot area, the OS area, the application area, the maintenance information area or the like from various kinds of data stored in the hard disk 11, and archive the data as backup data in each of the storing areas 1 through x, as described above.

At the time of the backup, the user may archive at least a part of the data in the hard disk 11 as the backup data as it is without processing it, or may perform a process such as compression or the like on at least a part of the data in the hard disk 11 and archive the data as the backup data.

Feature information or attribute information can be related to each of the storing areas. Namely, information about backup data to be archived in each of the storing area can be related to the backup data, and archived. The feature information is information showing the features of the backup data, which is, for example, a date when the backup is performed, features of the data at the time of the backup, information about compression (compressed or not, form of the compression, etc.), data capacity, etc. This information is mainly used when data relating to the system [for example, boot area, OS (Operating System) area, application (APL) area] is backed up.

The attribute information is information relating to information on a file to be backed up, backup schedule, etc., which is mainly used when an updatable data file is backed up.

FIG. 3 is a diagram showing an example of a management table for the hard disk for backup 6 in the backup system 1 according to the embodiment of this invention, which shows contents of backup data archived in the user allocation area of a certain user. The management table shown in FIG. 3 is managed by the ASP 4 or the backup server 5.

An item named "section" in the management table is set correspondingly to the above storing area in FIG. 2, for the sake of convenience. The sections 1 through x correspond to the storing areas 1 through x in FIG. 2, respectively, each of which specifies a specific storage area on the hard disk for backup 6. Each time the user performs the backup, a new column is added (x=x+1) as the section in the management table.

In the example shown in FIG. 3, each of the sections has a plurality (three in FIG. 3) of areas. In this embodiment, an item named "classification" is set to these areas, for the sake of convenience. Each of the classifications 1 through 3 specifies a specific storage area on the hard disk for backup 6.

In the example shown in FIG. 3, backup data in the boot area, the OS area, the application area on the hard disk 11 is archived in an area corresponding to the classification 1 in the hard disk for backup 6. The data area on the hard disk 11 is archived in an area corresponding to the classification 2. The maintenance information area on the hard disk 11 is archived in an area corresponding to the classification 3.

Items of area information, date and feature are related to the data archived in each of the classifications. The area information shows contents of the data. The area information shows which area on the hard disk 11 the data is stored in. The date is a date when the user performs the backup. The feature is information showing the type or the like of the OS.

Whereby, it is found that backup data in the boot area, the OS area and the application area on the hard disk 11 was archived in Jan. 1, 2002 in an area corresponding to the classification 1 in the section 1 in the hard disk for backup 6, for example. It is also found that the data in only the boot area, the OS area and the application area was backed up in Jan. 1, 2002, but data in the data area or the maintenance information area was not archived on the day.

Similarly, it is found that backup data in the data area on the hard disk 11 was archived in Feb. 1, 2002 in an area corresponding to the classification 2 in the section 2 in the hard disk for backup 6, for example. It is also found that data in the boot area, the OS area, the application area and the maintenance area was backed up in Feb. 1, 2002.

The APS 4 comprises an area determining unit 41, an archiving place determining unit 42 and a user information database (information for reference) 43, as shown in FIG. 1. The user information database 43 retains various kinds of information on each of the users. For example, name of the user, postal code, telephone number and address of a place in which the PC 10 used by the user is located, information on the type of the PC, password, etc., are related to the contract account of the user and recorded, whereby the user information database manages various kinds of information that can be used to specify the place in which the PC 10 used by the user is located.

FIG. 4 is a diagram showing an example of the user information database 43 in the backup system 1 according to the embodiment of this invention. In the example shown in FIG. 4, the user information database 43 has contractor information and archive information. The contractor information is information relating to a place where the user (or the PC 10 or the hard disk 11 that the user uses) is, which is configured by relating the postal code or telephone number to the contractor account. Incidentally, the archive information will be described later.

A contract account "ABC" is identification information set to the user C, for example. A postal code (812-0000) or a telephone number (011-*-) shows that a place where the user is, Fukuoka Prefecture for example, is related to the contract account, and recorded. Similarly, a contract account "EFG" is identification information set to the user A. A postal code (060-0000) or a telephone number (092-*-****) shows that a place where the user A is, Hokkaido for example, is related to the contract account, and recorded.

In this embodiment, each user uses a specific PC 10. For this, it is possible to specify the user of the PC 10 or the PC 10 by obtaining a contract account used in an access to the ASP 4 and referring to the user information database 43 on the basis of the contract account. Namely, the contract account functions as information for specifying the PC (information processing apparatus) 10 or information for specifying the user of the PC (information processing apparatus) 10.

In the user information database 43, a result of backup having been performed on the hard disk for backup 6 is related to the contract account, and stored as the archive information. In the example shown in FIG. 4, archive designation, section, classification and archiving place are recorded as the archive information.

The archive information is an item for recording whether the archiving place is determined by default or by user's designation (designated archiving place). In the item of the archive designation, information showing "default" or "designated archiving place" is recorded. The section and the classification are the section and classification in the management table shown in FIG. 3, which are items in which information showing an area in which the backup data is archived is recorded. The archiving place is an item, in which information for specifying the hard disk for backup 6 in the archiving place of the backup data or the backup server 5 controlling the hard disk for backup 6 is recorded.

The information recorded as the archive information is not limited to the archive designation, section, classification and/or archiving place described above. Alternatively, it is possible to record various kinds of information relating to the backup such as a date when the backup was performed, area information, feature, attribute, etc.

The area determining unit 41 determines an area in which the PC 10 connected to the ASP 4 is located. On the basis of the contractor information retained in the user information database 43, the area determining unit 41 determines an area in which the PC 10 is located.

In concrete, the area determining unit 41 refers to the user information database 43 on the basis of the contract account of the user inputted when the user accesses to the ASP 4, obtains a postal code or a telephone number of the user from the contractor information, and calculates (obtains) an area in which the PC 10 of the user is located on the basis of the postal code or the telephone number.

Since postal codes or toll numbers of telephone numbers are set to different numbers according to the areas, it is possible to specify an area in which the user resides by using a postal code or telephone number. In this embodiment, characteristics of postal code or telephone number are used to specify an area in which the user resides (or an area in which the PC 10 and the hard disk 11 are located). However, this invention is not limited to this example. Alternatively, at least a part of the address of the user may be beforehand retained in the user information database 43 to be used, for example. As this, the present invention may be modified in various ways without departing from the scope of the invention.

The method of determining the area in which the PC 10 is located by means of the area determining unit 41 is not limited to a method in which the area in which the PC 10 is located is obtained on the basis of the contractor information beforehand registered. Alternatively, it is possible to determine an area in which the PC 10 is located on the basis of an access point used when the PC 10 is connected to the ISP 2, or obtain an IP (Internet Protocol) address set to the PC 10 and determine an area in which the PC 10 is located on the basis of the obtained IP address. As this, this invention may be modified in various ways without departing from the scope of the invention.

The archiving place determining unit 42 determines an archiving place for backup data of the hard disk 11 connected to the PC 10 on the basis of the area in which the PC 10 is located determined by the area determining unit 41.

The archiving place determining unit 42 selects at least one hard disk for backup 6 located in a place physically (geographically) farthest from the area in which the PC 1 is located, which is determined by the area determining unit 41 among the plural (five in this embodiment) hard disks for backup 6 (6a, 6b, 6c, 6d and 6e), on the basis of the area in which the PC 10 of the user is located determined by the area determining unit 41 and areas in which the hard disks for backup 6 (6a, 6b, 6c, 6d and 6e) in the backup system 1 are located, and determines the selected hard disk for backup 6 as the archiving place for the backup data.

As the method of selecting a hard disk for backup 6 physically farthest from the area in which the PC 10 is archived, a distance between the PC 10 and the backup server 5 (hard disk for backup 6) is calculated on the basis of coordinates information (arbitrary coordinate space, the north latitude and the east longitude, etc.) and coordinates information on each of the backup servers 5 (hard disks for backup 6), and an archiving place is determined on the basis of a result of the calculation.

For example, when data in the PC 10a of the user A is backed up, the archiving place determining unit 42 selects a hard disk for backup 6e located in Okinawa that is a place farthest from Sapporo in the backup system 1 as the archiving place for the backup data, and determines it. The backup data is archived in the hard disk for backup 6e by means of the backup server 5e.

Similarly, when the user c using the PC 10c in Fukuoka backs up data in the hard disk 11c of the PC 10c, the archiving place determining unit 42 selects the backup server 5d located in Sapporo that is a place farthest from Fukuoka as the archiving place for the backup data, and determines it. Whereby, the backup data is archived in the hard disk for backup 6e by means of the backup server 5e.

In the backup system 1, the archiving place determining unit 42 basically selects a hard disk for backup 6 physically farthest from an area in which the PC 10 is located as the backing-up place, as above. Hereinafter, the backing-up place (hard disk for back up 6) selected and determined by the archiving place determining unit 42 is occasionally referred to as the backing-up place by default.

In the backup system 1, the user can select an arbitrary hard disk for backup 6 among the plural hard disks for backup 6 as the archiving place for the backup data. When the user desires to archive the backup data in a place other than the backing-up place by default determined by the archiving place determining unit 42, the user can beforehand select an arbitrary hard disk for backup 6 among the plural hard disks for backup 6 equipped in the backup system 1, by using the PC 10.

Namely, the PC 10 functions as an archiving place designation inputting unit which can selectively designate a specific hard disk for backup 6 among the plural hard disks for backup 6.

Figure 5:
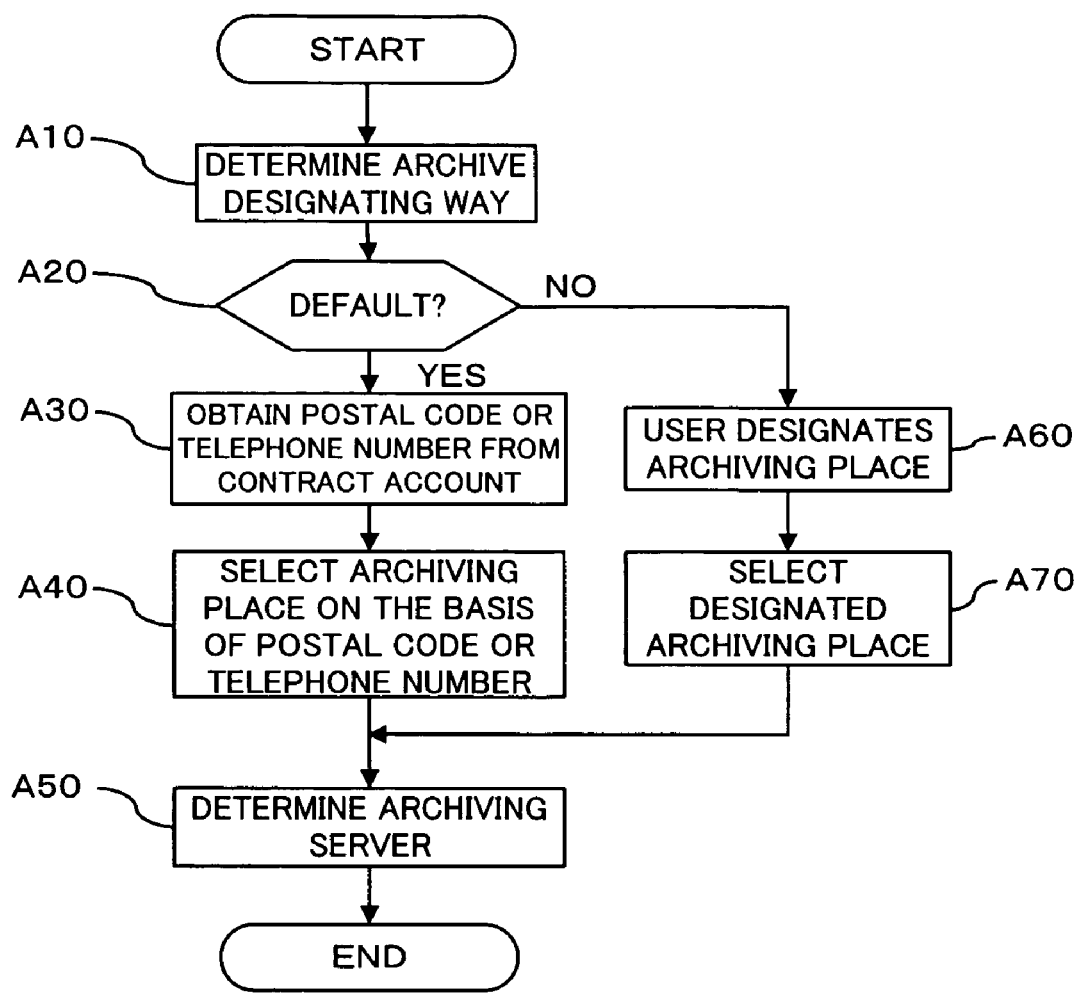
FIG. 5 is a flowchart for illustrating a method of determining an archiving place for backup data in the backup system according to the embodiment of this invention.

Next, a method for determining an archiving place for backup data in the backup system 1 according to the embodiment of this invention will be described with reference to a flowchart (steps A10 through A70) shown in FIG. 5.

The ASP 4 refers to the above flag to read a storage designating method of whether backup data is archived in a backing-up place by default or the backup data is archived in a hard disk for backup selected by the user (step A10), and determines whether or not the backup data is archived in the backing-up place by default (hard disk for backup 6) (step A20).

When the backup data is archived in the backing-up place by default (refer to YES route at step A20), the ASP 4 refers to the contract account of the user to obtain a postal code or telephone number of the user from the user information database 43 (step A30). The area determining unit 41 determines an area in which a PC 10 of the user is located on the basis of the obtained postal code or telephone number (area determining step).

The archiving place determining unit 42 selects and determines a backup server 5 (hard disk for backup 6) located in a place geographically farthest from the place in which the PC 10 is located, on the basis of the area in which the PC 10 (hard disk 11) is located determined by the area determining unit 41 and the area in which the hard disk for backup 6 is located (step A40; archiving place determining step), and determines the backup server 5 (hard disk for backup 6) as the archiving server (step A50).

On the other hand, when the backup data is not archived in the backing-up place by default (refer to NO route at step A20), the user selects an arbitrary backing-up place (hard disk for backup 6) using the PC 10 (step A60; archiving place designation inputting step). The archiving place determining unit 42 obtains the designated hard disk for backup 6 (step A70). The procedure then moves to step A50.

At least a part of data in the hard disk 11 is archived as the backup data in the hard disk for backup 6 determined as above as the archiving place for the backup data (backup process step).

In this embodiment, determination on an area in which the PC 10 is located by the area determining unit 41 or determination on an archiving place for the backup data by the archiving place determining unit 42 is performed each time the user carries out the backup. Since these processes are performed by not much complicated algorithm, the ASP 4 is not required to bear excessively large load. It is thus considered that these processes do not exert adverse effect even if these processes are performed each time the user carries out the backup.

In the backup system 1, the backup data archived in the hard disk for backup 6 can be restored onto the hard disk 11 of each of the PCs 10. At this time, the user can select arbitrary backup data in the plural sets of backup data archived in the hard disk for backup 6, using the PC 10. The backup server 5 obtains the selected backup data from the hard disk for backup 6, and transmits the data to the PC 10 that the user uses.

The PC 10 receiving the backup data from the backup server 5, for example, overwrites the backup data on the hard disk 11 to restore the backup data.

FIG. 6(*a*) is a diagram showing a list in which plural kinds of backup data managed by the backup server 5 in the backup system 1 are arranged in time series according to the embodiment of this invention. FIG. 6(*b*) is a diagram schematically showing a structure of the restored hard disk 11.

As shown in FIG. 6(*a*), the backup server 5 can show plural sets of backup data corresponding to a contract account of a certain user as a list in which the data is arranged in time series to the user accessing to the ASP 4 using the PC 10 in order to restore the backup data. The user can arbitrarily select backup data that the user desires to restore in the list of the backup data. The backup server 5 transmits the backup data so selected to the hard disk 11 of the PC 10 to restore the disk image thereof.

When the user selects backup data to be restored, the user can select only a part of the backup data in such a manner that the user selects only the backup data (data area) stored in the data area (classification 3) in the section 5, or select all the data (classifications 1 to 3) in the sections n, for example.

Alternatively, as shown in FIG. 6(*b*), the user may selectively combine backup data in different sections in such a manner that the user selects backup data in the classification 3 in the section n, backup data in the classification 2 in the section 4 and backup data in the classification 1 in the section 2, for example. Whereby, it is possible to form a disk image in a state that the user desires on the hard disk 11.

Namely, the PC 10 functions as a backup data selecting unit which can select at least one set of backup data from plural sets of backup data. The backup server 5 and the PC 10 together function as a restoring process unit which restores backup data stored in the hard disk for backup 6 onto an arbitrary hard disk 11.

Next, description will be made of a back up process in the backup system 1 according to the embodiment of this invention structured as above with reference to a flowchart (steps B10 through B40) shown in FIG. 7.

When the user starts the PC 10, the OS is started (step B10), and the PC 10 is connected to the Internet 3 through the ISP 2.

The user has an access to the ASP 4 (accesses to the network) using the PC 10 (step B20). When having an access to the ASP4, the user inputs a contract account or password beforehand set.

After having an access to the ASP 4, the user selects data (data area) to be backed up on the hard disk 11. The archiving place determining unit 42 determines an archiving place for the backup data (step B30). The determination on the archiving place is performed according to the flowchart shown in FIG. 5.

In order to archive the selected data in the hard disk for backup 6, which is the archiving place determined by the archiving place determining unit 42, the ASP 4 selects a backup server 5 managing the hard disk for backup 6. The selected backup server 5 obtains the backup data from the PC 10 (hard disk 11), and archives the backup data in a predetermined area on the hard disk for backup 6 (step B40).

Figure 8:
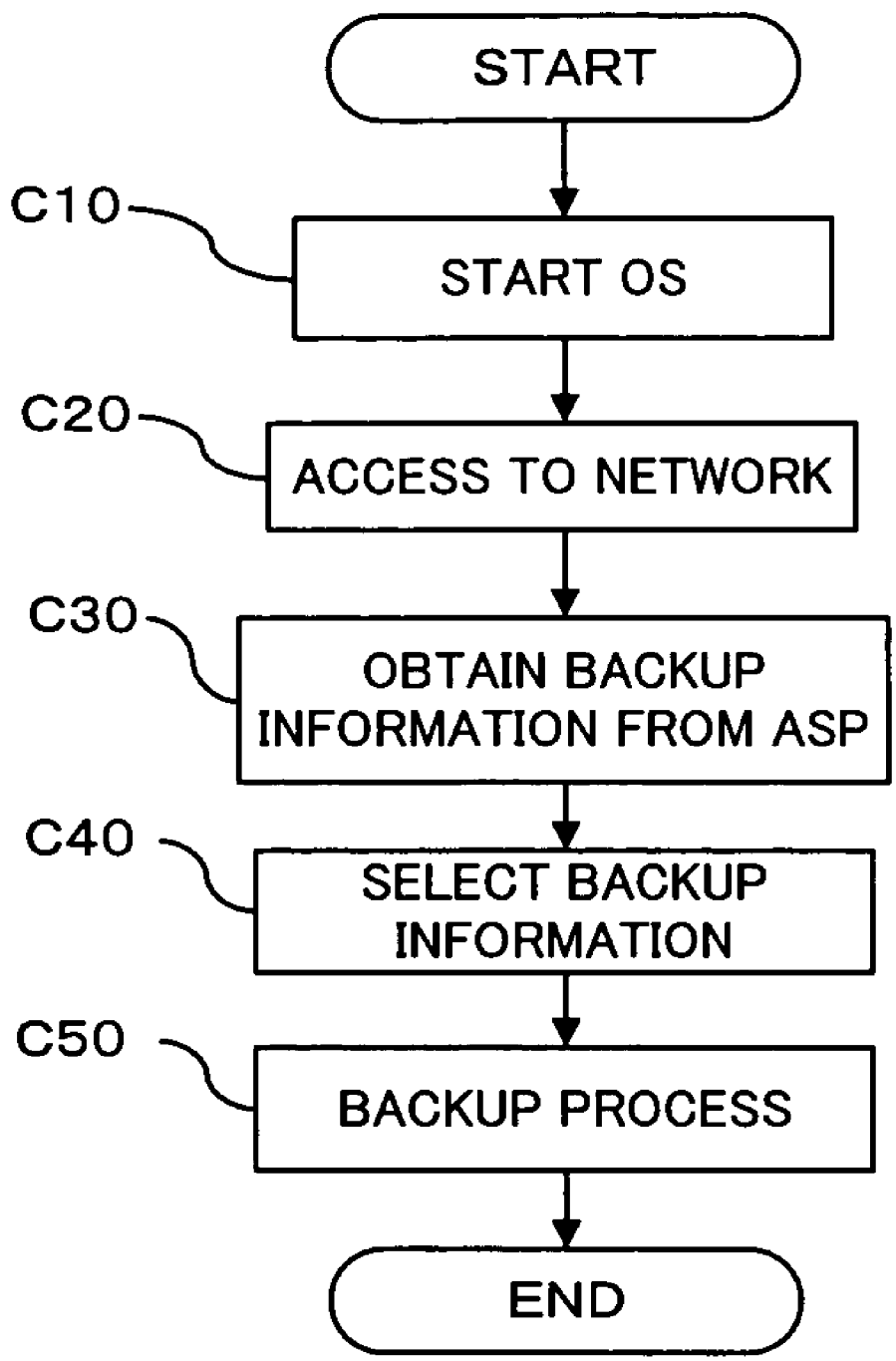
FIG. 8 is a flowchart for illustrating a backup data restoring process in the backup system according to the embodiment of this invention.

Next, description will be made of a backup data restoring process in the backup system 1 according to the embodiment of this invention with reference to a flowchart (steps C10 through C50) shown in FIG. 8.

When the user starts the PC 10, the OS is started (step C10), and the PC 10 is connected to the Internet 3 through the ISP 2. The user has an access to the ASP 4 (accesses to the network) using the PC 10 (step C20). When having an access to the ASP4, the user inputs a contract account or password beforehand set.

The ASP 4 transmits a list of backup data as shown in FIG. 6(*a*) to the PC 10, displays the list on a display (not shown) of the PC 10 (step C30). The user arbitrarily selects backup data to be restored onto the hard disk 11 in the backup data (step C40). The backup server 5 transmits the selected backup data to the hard disk 11 of the PC 10, and restores a disk image of the data in cooperation with the PC 10 (step C50).

In the backup system 1 according to the embodiment of this invention, the archiving place determining unit 42 determines a backup data storage physically (geographically) far from an area in which the hard disk 11 (PC 10) is located among the plural hard disks for backup 6 as the archiving place on the basis of the area in which the hard disk 11 (PC 10) is located. The backup server 5 archives the backup data in the hard disk for backup 6 determined as the archiving place. Even when the hard disk 11 of the PC 10 is damaged or lost due to disaster caused by an earth quake, flood or the like, or an accident such as hard disk failure, infection of virus, operation abnormality caused by installation of a driver or application for connecting a new peripheral equipment, etc., it is possible to diminish a risk that a hard disk for backup 6 archiving the backup data therein is simultaneously damaged, and improve the security level of the data.

Even when data in the PC 10 or the hard disk 11 of the user is lost due to disaster such as an earth quake, fire or the like, it is possible to restore the data with the backup data archived in the hard disk for backup 6 by accessing to the ASP 4 over the Internet 3 after the PC 10 is restored, for example. In case of disaster, an accident or the like, it is also possible to restore the contents of the hard disk 11 of the PC 10, quickly and certainly, to a state closest to the state before the abnormality occurs on the basis of contents backed up by the ASP 4. Such system can be established with the minimum facility investment.

The area determining unit 41 determines an area in which the hard disk 11 (PC 10) is located, and the archiving place determining unit 42 selectively determines a hard disk for backup 6 physically far from the hard disk 11 as the archiving place among the plural hard disks for backup 6 on the basis of the area in which the hard disk 11 is located determined by the area determining unit 41. Accordingly, it is possible to archive the backup data, readily and certainly, in a hard disk for backup 6 physically far from the hard disk 11. This is very useful.

Further, the user can selectively designate a specific hard disk for backup 6 among the plural hard disks for backup 6, using the PC 10. Accordingly, it is possible to set an archiving place that the user desires. This is very convenient.

Information relating to the backup data is inputted as attribute information from the PC 10 or the like, and the inputted attribute information is related to the backup data and recorded on the hard disk for backup 6. Accordingly, discrimination of each backup data becomes easily. This is very helpful when the backup data is restored onto the hard disk 11.

When various kinds of data in the PC is backed up before a work that may cause a change in the system environments of the PC 10 such as installation of an application, addition of new hardware or the like, it is possible to readily know the created backed up data and the features of the system at that time. It is unnecessary for each user to manage the backup data, which can reduce the burden on the user required for the management.

When data is partly extracted from data in the hard disk 11 to make backup data, and the backup data is archived on the hard disk for backup 6 and restored onto the hard disk 11, the user selects at least one set of backup data from the plural sets of backup data and restores the data. Thus, the user can readily form the hard disk having a data structure that the user desires. This is very helpful.

At this time, not only work files (data area) present on the hard disk 11 but also each of the boot area, the OS area, the maintenance area and the data area can be archived as the backup data and restored. This can omit a work of installing the OS file, driver file, application software and the like other than the work files. This is very helpful.

The CPU (Central Processing Unit) of the information processing apparatus functions as the above area determining unit 41 and the archiving place determining unit 42 by executing a program stored in a computer readable recording medium (for example, memory, magnetic storage device, flexible disk, memory card, magneto-optical storage device, CD-ROM, CD-R, CD-RW, DVD, DVD-R, DVD-RW or the like).

The program (backup controlling program) for realizing the functions of the area determining unit 41 and the archiving place determining unit 42 is recorded on a computer readable recording medium such as a flexible disk, CD-ROM, CD-R, CD-R/W, DVD, DVD-R, DVD-R/W, magnetic disk, optical disk, magento-optical disk or the like, and provided. The computer reads out the program from the recording medium, transfers the program to the internal storage or an external storage, stores the program therein, and uses the program. Alternatively, the program may be recorded on a storage (recording medium) such as a magnetic disk, optical disk, magneto-optical disk or the like, for example, and provided to the computer from the storage over a communication line.

When the functions of the area determining unit 41 and the archiving place determining unit 42 are realized, the program stored in the internal storage (RAM or ROM of a printer in this embodiment) is executed by the microprocessor of the computer (CPU of the printer in this embodiment). Alternatively, the computer may read the program stored in the recording medium and execute the same, at this time.

In this embodiment, "computer" is a concept including hardware and an operating system, which signifies hardware operating under the control of the operating system. When the hardware is operated by only the application program without necessity of the operating system, the hardware itself corresponds to the computer. The hardware has at least a microprocessor such as a CPU or the like and a means for reading the computer program recorded on the recording medium. In this embodiment, each of the ASP4, the PC 10 and the backup server 5 has a function as the computer.

As the recording medium according to this embodiment, usable are various types of computer readable media such as IC card, ROM cartridge, magnetic tape, punched card, internal storage (memory such as RAM or ROM) of the computer, external storage, printed matter on which codes such as bar codes or the like are printed and the like other than the above flexible disk, CD-ROM, CD-R, CD-R/W, DVD, DVD-R, DVD-R/W, magnetic disk, optical disk, magneto-optical disk and the like.

Note that the present invention is not limited to the above embodiment, but may be modified in various ways without departing from the scope of the invention.

For example, the method for connecting the PC 10 to the Internet 3 is not limited to the above example, but the PC 10 may be connected to the Internet 3 in any one of various ways by means of a cable television, radio, optical fiber and the like.

The determination in the archiving place designation method is not limited to determination using a flag as above, but various methods are applicable.

In the above embodiment, the backup servers 5 (hard disks for backup 6) are located in five areas, that is, Fukuoka, Tokyo, Osaka, Okinawa and Sapporo, but the places in which the backup servers 5 are located are not limited to the above places. The backup servers 5 may be located in four places or less, or six places or more differing from one another. If the backup servers 5 (hard disks for backup 6) are located in areas away from each other across the sea (for example, Hokkaido and Honshu, or Honshu and Hokkaido, etc.), or areas in different earthquake zones, the effect of disaster such as an earthquake or the like can be held down to the minimum.

In the above embodiment, the contract account functions as information for specifying the PC (information processing apparatus) 10 or information for specifying the user of the PC (information processing apparatus) 10, but this invention is not limited to this. Other various kinds of information may be used as information for specifying the PC 10 or information for specifying the user of the PC 10.

In which case, a specific hard disk for backup 6 is beforehand set as the backing-up place by default for each of the users, and the archiving place determining unit 42 selects a hard disk for backup 6 on the basis of this information. Whereby, it becomes unnecessary to determine the archiving place for backup data by calculation each time, and it becomes possible to reduce the load on the ASP 4.

Alternatively, a hard disk for backup 6 (backup server 5) in an archiving place may be beforehand set for each user in a table or the like (information for reference; for example, the user information database 43 or the like), and the archiving place determining unit 42 may determine an archiving place for backup data by referring to the table.

Still alternatively, the user may set the degree of importance to each backup data, and may preferentially set a hard disk for backup 6 farther from the area in which the hard disk 11 is located as the archiving place as the degree of importance is higher among the plural hard disk for backup 6 according to the importance. The degree of importance may be set to each of the data area, the boot area, the OS area, the application area and the maintenance information area, or may be set to each data.

In the above embodiment, an arbitrary part of various kinds of information stored in the hard disk 11 such as the data area, the boot area, the OS area, the application area, the maintenance information area, etc. is extracted as the backup data, and archived. However, this invention is not limited to this example. The whole data in the hard disk 11 may be retained as the backup data.

In the above embodiment, as a method of selecting a hard disk for backup 6 physically farthest from the area in which the PC 10 is located, a distance between the PC 10 and the backup server (hard disk for backup 6) is calculated on the basis of coordinates information (arbitrary coordinate space, or the north latitude and east longitude, etc.) on an area specified on the basis of a postal code or telephone number, and coordinates information on each of the backup servers 5 (hard disks for backup 6). This invention is not limited to this example. This invention may be modified in various ways without departing from the scope of the invention. For example, a hard disk for backup 6 may be beforehand set as the archiving place in each area, using another algorithm.

In the above embodiment, the ASP 4 provides, as the application function, the backup function of archiving data in the hard disk 11 of the PC 10 as the backup data in at least one of the plural hard disks located in different areas. However, this invention is not limited to this example. The ASP 4 may provide various application functions other than the backup function. As these application functions, there are various application functions for the basic operation system such as finance, accounting, personnel and the like, the front office system such as group ware, business support and the like, the specialized business system supporting specific type/service of business such as warehouse business, restaurant and food service business and the like, the EC (Electronic Commerce) site system, etc.

Meanwhile, disclosure of the embodiment of this invention enables persons skilled in the art to manufacture the invention.

INDUSTRIAL APPLICABILITY

The backup system, the backup controlling apparatus, the backup of data managing method and the computer readable recording medium on which the backup controlling program is recorded according to this invention are suited to back up a storage of an information processing apparatus such as a computer or the like, as described above.

What is claimed is:

1. A backup system comprising:
    a plurality of backup data storages, located in areas differing from one another, backing up data, as backup data, stored in a storage provided to an information processing apparatus;
    an archiving place determining unit selectively determining a backup data storage physically away from an area in which said storage is located among said plural backup data storages as an archiving place on the basis of said area in which said storage is located; and
    a backup processing unit storing the data stored in said storage into said backup data storage determined as said archiving place by said archiving place determining unit.

2. The backup system according to claim 1 further comprising:
    information for reference configured by beforehand relating information for specifying said information processing apparatus or information for specifying a user of said information processing apparatus to said backup data storage physically away from said area in which said storage provided to said information processing apparatus is located; and
    said archiving place determining unit referring to said information for reference on the basis of said information for specifying said information processing apparatus or said information for specifying a user of said information processing apparatus, and selectively determining said backup data storage as said archiving place among said plural backup data storages.

3. The backup system according to claim 1 further comprising:
    an area determining unit communicably connected to said information processing apparatus over a communication line, and determining an area in which said storage is located; and
    said archiving place determining unit selectively determining, on the basis of said area in which said storage is located determined by said area determining unit, said backup data storage physically away from said area in which said storage is located as said archiving place among said plural backup data storages.

4. The backup system according to claim 1 further comprising:
    a degree-of-importance designating unit designating a degree of importance of data in said storage; and
    said archiving place determining unit preferentially determining a backup data storage physically farther from said area in which said storage is located as said degree of importance is higher among said plural backup data storages according to said degree of importance designated by said degree-of-importance designating unit.

5. The backup system according to claim 1 further comprising:
    an archiving place designation inputting unit being able to selectively designate a specific backup data storage among said plural backup data storages; and
    said archiving place determining unit selectively determining said backup data storage designated by said archiving place designation inputting unit as said archiving place.

6. A backup controlling apparatus for backing up data stored in a storage provided to an information processing apparatus, as backup data, by storing the data into at least one of a plurality of backup data storages located in areas differing from one another, comprising:
    an archiving place determining unit selectively determining a backup data storage physically away from an area in which said storage is located as an archiving place among said plural backup data storages on the basis of said area in which said storage is located.

7. The backup controlling apparatus according to claim 6 further comprising:
    information for reference configured by relating information for specifying said information processing apparatus or information for specifying a user of said information processing apparatus to said backup data storage physically away from said area in which said storage provided to said information processing apparatus is located; and
    said archiving place determining unit referring to said information for reference on the basis of said information for specifying said information processing apparatus or said information for specifying a user of said information processing apparatus, and selectively determining said backup data storage as said archiving place among said plural backup data storages.

8. The backup controlling apparatus according to claim 6 further comprising:
   an area determining unit communicably connected to said information processing apparatus over a communication line, and determining said area in which said storage is located; and
   said archiving place determining unit selectively determining, on the basis of said area in which said storage is located determined by said area determining unit, said backup data storage physically away from said area in which said storage is located as said archiving place among said plural backup data storages.

9. The backup controlling apparatus according to claim 6, wherein said archiving place determining unit preferentially determining a backup data storage unit physically farther from said area in which said storage is located as a degree of importance of data in said storage is higher as said archiving place among said plural backup data storages according to the degree of importance of data in said storage.

10. The backup controlling apparatus according to claim 6, wherein information about said backup data is related as attribute information to said backup data, and recorded.

11. The backup controlling apparatus according to claim 6 further comprising:
   a restoration processing unit restoring said backup data stored in said backup data storage onto an arbitrary storage.

12. A backup data managing method for backing up data stored in a storage provided to an information processing apparatus, as backup data, by storing the data into at least one of a plurality of backup data storages located in areas differing from one another, comprising:
   determining a backup data storage physically away from an area in which said storage is located among said plural backup data storages as an archiving place on the basis of said area in which said storage is located; and
   storing said data stored in said storage into said determined backup data storage.

13. The backup data managing method according to claim 12 further comprising:
   preparing information for reference configured by relating information for specifying said information processing apparatus or information for specifying a user of said information processing apparatus to said backup data storage physically away from said area in which said storage provided to said information processing apparatus is located; and
   at said determining, said information for reference being referred on the basis of said information for specifying said information processing apparatus or said information for specifying a user of said information processing apparatus to selectively determine said backup data storage as said archiving place among said plural backup data storages.

14. The backup data managing method according to claim 12 further comprising:
   determining said area in which said storage is located; and
   determining, on the basis of said determined area in which said storage is located, said backup data storage physically away from said area in which said storage is located being selectively determined as said archiving place among said plural backup data storages.

15. The backup data managing method according to claim 12 further comprising:
   designating a degree of importance of data in said storage; and
   determining a backup data storage physically farther from said area in which said storage is located being determined as said archiving place as said degree of importance is higher among said plural backup data storages according to said designated degree of importance.

16. The backup data managing method according to claim 12 further comprising:
   inputting a specific backup data storage which can be selectively designated among said plural backup data storages; and
   determining, during said determining a backup data storage, said inputted backup data storage as said archiving place.

17. A computer readable recording medium recorded thereon a backup controlling program for making a computer execute a backup controlling function of backing up data stored in a storage provided to an information processing apparatus, as backup data, by storing the data into at least one of a plurality of backup data storages located in areas differing from one another; and
   said backup controlling program making said computer function as an archiving place determining unit for selectively determining a backup data storage physically away from an area in which said storage is located as an archiving place among said plural backup data storages on the basis of said area in which said storage is located.

18. The computer readable recording medium recorded thereon a backup controlling program according to claim 17, wherein said archiving place determining unit refers to, on the basis of information for specifying said information processing apparatus or information for specifying a user of said information processing apparatus, information for reference configured by relating said information for specifying said information processing apparatus or said information for specifying a user of said information processing apparatus to said backup data storage physically away from said area in which said storage provided to said information processing apparatus is located, and selectively determines said backup data storage as said archiving place among said plural backup data storages.

19. The computer readable recording medium recorded thereon a backup controlling program according to claim 17, wherein said backup controlling program makes said computer function as an area determining unit for determining said area in which said storage is located; and
   said archiving place determining unit selectively determines, on the basis of said area in which said storage is located determined by said area determining unit, said backup data storage physically away from said area in which said storage is located as said archiving place among said plural backup data storages.

20. The computer readable recording medium recorded thereon a backup controlling program according to claim 17, wherein said archiving place determining unit preferentially determines a backup data storage physically farther from said area in which said storage is located as said archiving place as a degree of importance of data in said storage is higher among said plural backup data storages according to the degree of importance of data in said storage.

* * * * *